F. BAKER, Jr., AND S. COOPER.
PROCESS OF REMOVING SHELLS FROM COCOANUTS.
APPLICATION FILED AUG. 21, 1917. RENEWED AUG. 30, 1918.
1,380,859.
Patented June 7, 1921.
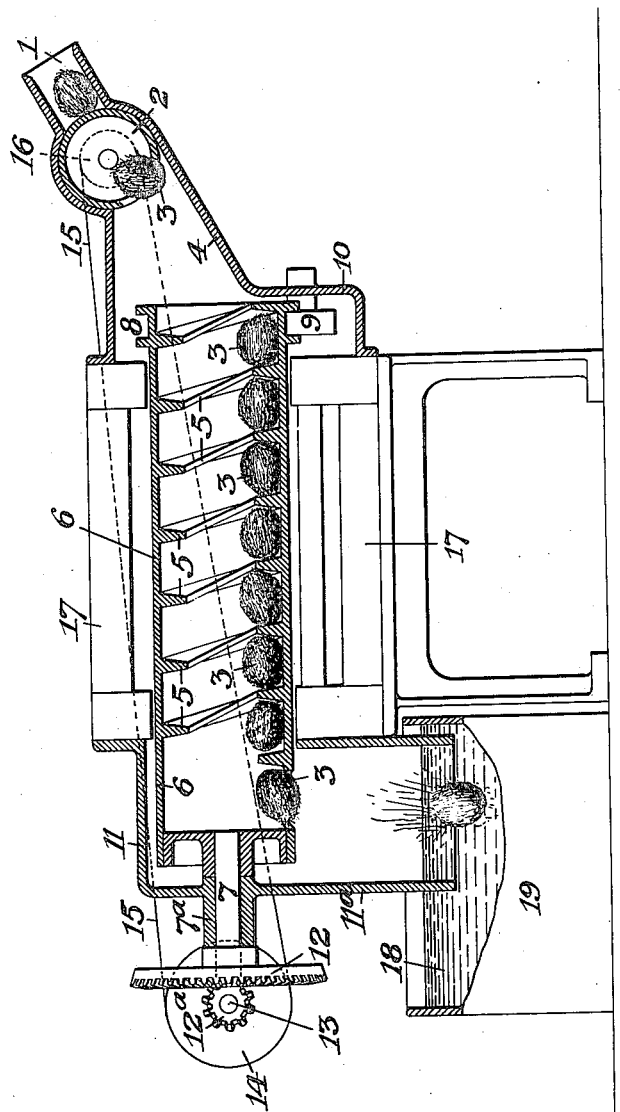

UNITED STATES PATENT OFFICE.

FRANKLIN BAKER, JR., OF PHILADELPHIA, PENNSYLVANIA, AND SIMON COOPER, OF NEW YORK, N. Y., ASSIGNORS TO THE FRANKLIN BAKER COMPANY, OF PHILADELPHIA, PENNSYLVANIA, A CORPORATION OF PENNSYLVANIA.

PROCESS OF REMOVING SHELLS FROM COCOANUTS.

1,380,859. Specification of Letters Patent. Patented June 7, 1921.

Application filed August 21, 1917, Serial No. 187,351. Renewed August 30, 1918. Serial No. 252,121.

*To all whom it may concern:*

Be it known that we, FRANKLIN BAKER, Jr., and SIMON COOPER, citizens of the United States, and residents of Philadelphia, Pennsylvania, and New York city, New York, respectively, have invented an Improved Process of Removing Shells from Cocoanuts, of which the following is a specification.

Our invention relates to the shelling of cocoanuts, and it comprises an improved method or process for facilitating the removal of the shells of cocoanuts without injury to the meat or kernel of the same, and whereby the latter can be readily removed for any desired purpose or subsequent use.

It has long been the practice to break the shells with a hammer or similar tool, and machines have been proposed for cracking the shell by blows imparted by various means; all of which operations, however, are relatively slow and inefficient. In addition, by reason of the fact that a relatively thick membrane or skin lies between the shell and the kernel, considerable difficulty is experienced in removing the shell after it has been cracked.

Our invention is based upon the discovery that by subjecting the shell to a very high temperature for a very brief period of time, such shell is rendered brittle and can be more easily broken away from the kernel or meat; either by application of a suitable tool or by the act of causing one nut to strike another upon rotating the same in a rumble or other suitable machine.

In subjecting the cocoanuts to a high degree of heat, it is possible that some destructive distillation of the volatile elements in the shell may occur, but in no instance does the heat affect the kernel; no rise in temperature of the milk within the kernel being perceptible in practice.

In carrying our invention into effect, we prefer to heat the cocoanut in a non-oxidizing medium, since by such procedure we avoid burning the cocoanut or injuring in any way the meat or kernel of the nut.

As illustrating means which may be employed in carrying out our process, reference is made to the accompanying drawing, wholly diagrammatic, showing a longitudinal sectional view of a heating apparatus with conveying means combined therewith.

In this structure, 1 represents a spout to which cocoanuts may be delivered; such spout having a rotating valve 2 arranged to accommodate one nut at a time, and receiving the same when its open mouth is rotated past the open spout 1. Continued rotation of the valve 2 will deliver the nuts, indicated at 3, to an inclined passage 4 from which they may be discharged to a helical track 5 formed on the inside of a rotatable cylinder 6. The cylinder carries at one end a shaft 7 forming an axial support at said end, while at the opposite end the cylinder may be flanged at 8 and adapted to turn on rollers 9 suitably journaled in the front frame or housing 10 of the apparatus. The rear housing 11 contains a bearing $7^a$ for the shaft 7, which has at its outer end a beveled gear 12 meshing with a bevel pinion $12^a$ on a driving shaft 13. This shaft carries a pulley 14 over which passes a belt 15 to a pulley 16 carried by the valve 2 and by means of which the latter is driven. Surrounding said rotatable cylinder is a furnace 17 of fire brick, which may have burners for using gas or oil fuel whereby the cylinder may be sufficiently heated to perform the desired function of charring the shells of the nuts.

The rear housing 11 has a downwardly depending extension $11^a$ having its open mouth immersed in a liquid bath 18 contained within a vessel 19 so that nuts carried forward by the helical track of the cylinder may be discharged into said liquid bath without coming into contact with the atmosphere. The rotating valve 2 at the receiving end of the structure is air-tight to insure a non-oxidizing medium within the furnace; excluding all air from the furnace except that entering with the nuts.

In practice it has been found that by proper regulation of the time period of the application of the intense heat to the cocoanuts, vapor or steam will be generated in the pulpy skin between the shell and the kernel; effecting a substantial cooking of the pulpy skin and at the same time destroying the natural bond between the kernel and the shell so that the latter may be readily removed when it is cracked or broken.

The temperature to which the nut is subjected causes rapid and intense evolution of any volatile matter in the shell, and this heating is always under conditions which exclude oxygen in order to prevent burning of the kernel. It is desirable to arrest the heating of the cocoanut at the proper moment, which may be when steam or vapor is generated in the pulpy lining of the shell, and as soon as this occurs the nuts are immediately passed to a bath of cool liquid. Upon removal from this bath after the heating described, the shell will be found to have lost its elasticity, and to have become exceedingly brittle, readily cracked or chipped, and removable by any mechanical means or by tumbling the nuts together in a suitable rumbling machine; a condition enhanced by the lack of adhesion existing between the inner surface of the shell, the pulpy layer, and the surface of the kernel.

The heat necessary to insure proper action upon the shell of the nut, whether it effects destructive distillation of such shell or not, may be within quite a range of temperatures, from a dull red heat to a bright white heat, and the period of time in which the nut is subjected to the necessary heat is determined by the speed at which the heat penetrates the shell to the pulpy lining. During such heating, the pulpy lining between the shell and the kernel or meat of the nut acts to insulate such meat from the intense heat; thereby preventing any heating of the meat and insuring maintenance of the same in its original condition.

We claim:

1. The process which comprises subjecting whole nuts to the influence of a temperature so extreme and for a time sufficient to loosen the bond between shell and kernel without discoloring the meat of the kernel or destroying its integrity, composition and edible quality, and so as to render the shell more readily frangible, suddenly arresting the extreme temperature action, and removing the shell.

2. The process which comprises subjecting whole nuts to the action of heat intense enough and for a time brief enough to loosen the bond between the shell and the kernel without discoloring the meat of the kernel or destroying its integrity, composition and edible quality, and so as to render the shell more readily frangible, suddenly arresting the heat action, and removing the shell.

3. The process which comprises subjecting whole nuts, in a non-oxidizing medium to the action of heat intense enough and for a time brief enough to loosen the bond between the shell and the kernel without discoloring the meat of the kernel or destroying its integrity, composition and edible quality, and so as to render the shell more readily frangible, suddenly arresting the heat action, and removing the shell.

4. The process of removing the shells of edible nuts, which comprises rendering the shells brittle by the application of heat without otherwise impairing their integrity and without affecting the kernels, suddenly arresting the action of heat upon the shells, and then breaking said shells.

5. The process of removing the shells of edible nuts, which comprises rendering the shells brittle by the application of intense heat, without otherwise impairing their integrity, suddenly arresting the action of heat upon the shells before the kernel is affected thereby, and then breaking said shells.

6. The process of removing shells from oil-bearing nuts, which comprises subjecting whole oil-bearing nuts to a high temperature in a non-oxidizing medium, arresting the heat action before it affects the kernel, and then breaking said shells.

7. The process of treating oil-bearing nuts for the purpose of removing the shells therefrom, which comprises moving the nuts through a non-oxidizing medium at high temperature, arresting the heat action before it affects the kernel, and then breaking the shell.

8. The process of treating oil-bearing nuts for the purpose of removing the shells therefrom, which comprises moving the nuts through a non-oxidizing medium at high temperature, arresting the heat action before it affects the kernel by immersing the nuts in a cooling liquid, and then breaking the shells.

9. The process of removing cocoanut shells, which comprises heating whole cocoanuts to render the shell brittle, suddenly arresting the heating action upon the shell, without otherwise impairing their integrity, and then breaking said shell.

10. The process of removing cocoanut shells, which comprises subjecting whole cocoanuts to a temperature sufficiently high to render the shell brittle without otherwise impairing their integrity and without affecting the kernel, suddenly arresting the heating action upon the shell, and then breaking said shell.

11. The process of removing cocoanut shells, which comprises subjecting whole cocoanuts to a high temperature for a brief period of time sufficient to render the shell brittle without affecting the kernel, immersing the shell in a bath of cool liquid to arrest further action of the heat upon the shell and prevent the heat reaching the kernel, and then breaking said shell.

12. The process of treating cocoanuts for the purpose of removing the shells therefrom, which comprises subjecting whole cocoanuts to a high temperature in a non-oxidizing medium, and arresting the heat action before it affects the kernel.

13. The process of treating cocoanuts for the purpose of removing the shells therefrom, which comprises subjecting the cocoanuts to a high temperature in a non-oxidizing medium, and arresting the heat action before it affects the kernel by immersing the cocoanuts in a bath of cool liquid.

14. The process of treating cocoanuts for the purpose of removing the shells therefrom, which comprises subjecting whole cocoanuts to a high temperature in a non-oxidizing medium for a brief period of time; such temperature removing the volatile matter of the shell and generating steam or vapor in the pulpy lining between the shell and kernel, and arresting the heat action by immersing the nuts in a bath of cool liquid.

15. The process of treating cocoanuts for the purpose of removing the shells therefrom, which comprises subjecting whole cocoanuts to a high temperature in a non-oxidizing medium for a brief period of time; such temperature removing the volatile matter of the shell and generating steam or vapor in the pulpy lining between the shell and kernel, arresting the heat action by immersing the nuts in a bath of cool liquid, and finally tumbling the cocoanuts to break the shell therefrom.

16. The process of treating cocoanuts for the purpose of removing the shells therefrom, which comprises driving off volatile matter of the shell by the application of an intense temperature in a non-oxidizing medium in order to reduce the structural strength of the shell, and suddenly arresting the reduction of strength by subjecting the cocoanut to a liquid bath.

17. The process of treating cocoanuts for the purpose of removing the shells therefrom, which comprises subjecting the cocoanuts to an intensely high temperature in a non-oxidizing medium whereby volatile matter of the shell is driven off and the structural strength of the shell reduced, and suddenly arresting the heat action before it affects the kernel by immersing the cocoanuts in a bath of cool liquid.

FRANKLIN BAKER, Jr.
SIMON COOPER.